July 9, 1946.  F. J. KASZUBA  2,403,533

NONSTATIC PHOTOGRAPHIC FILM

Filed Aug. 18, 1943

*Fig. 1,*

3 — Photographic Emulsion
2 — Gelatine Subbing Layer
1 — Film Base Containing Anti Static Resin

*Fig. 2,*

3 — Emulsion
2 — Gelatine Sub Containing Anti Static Resin
1 — Film Base
2 — Gelatine Sub Containing Anti Static Resin
3 — Emulsion

*Fig. 3,*

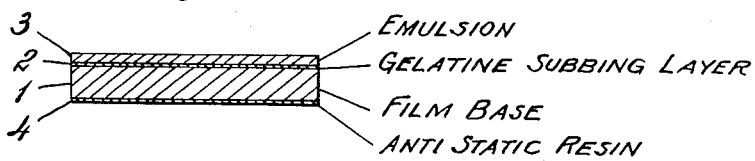

3 — Emulsion
2 — Gelatine Subbing Layer
1 — Film Base
4 — Anti Static Resin

*Fig. 4.*

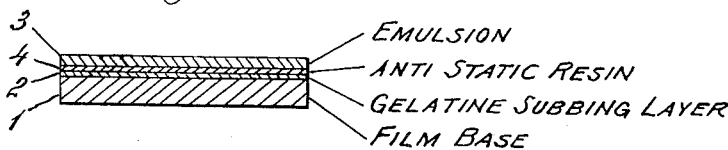

3 — Emulsion
4 — Anti Static Resin
2 — Gelatine Subbing Layer
1 — Film Base

INVENTOR
FRANK J. KASZUBA
BY Henry W. Coughlin
ATTORNEY

Patented July 9, 1946

2,403,533

UNITED STATES PATENT OFFICE 2,403,533

NONSTATIC PHOTOGRAPHIC FILM

Frank J. Kaszuba, Binghamton, N. Y., assignor to General Aniline & Film Corporation, New York, N. Y., a corporation of Delaware Application August 18, 1943, Serial No. 499,037

10 Claims. (Cl. 95—9)

The present invention relates to the manufacture of anti-static articles and is particularly directed to the production of sheets or films having anti-static properties valuable for use as photographic films.

One of the principal objects of this invention is to provide moulded articles which have properties which prevent defects and avoid difficulties caused by the accumulation of static electricity on such articles. Additional objects will be apparent from the detailed description which follows:

In the accompanying drawing Figs. 1, 2, 3 and 4 are diagrammatic sections of three specific embodiments of the present invention as applied to photographic film. It is well known that sheets or films and other moulded articles manufactured from electrifiable highly polymeric colloids such as cellulose derivatives, polyvinyl compounds, albumen derivatives such as gelatin and casein, easily become charged with static electricity. This property is frequently quite troublesome. For instance, in the case of photographic films, the photographic emulsion layer is liable to so-called static markings which are capable of development and thus spoil the film. It is also undesirable in very thin films of electrifiable highly polymeric colloids such as polyvinyl chloride or acetyl cellulose which are used in the manufacture of cigarette tips and numerous uses in the textile field. When these articles receive static charges they tenaciously adhere to non-conductors and can be removed therefrom without injury only with greatest difficulty.

I have discovered that moulded articles of electrifiable highly polymeric colloids may be made non-static by incorporating in such materials a relatively minor amount of resin of the type obtained as the intermolecular polycondensation product of a dibasic organic acid or anhydride and a hydroxy amine. This anti-static resin may either be incorporated in direct admixture with the electrifiable highly polymeric colloid or may be applied to one or both surfaces thereof as a separate layer.

Many materials used for the production of films and sheets are electrifiable highly polymeric colloids and are rendered non-static in accordance with the present invention. Typical examples of such electrifiable highly polymeric colloids are: cellulose derivatives, as cellulose acetate and cellulose nitrate, regenerated cellulose and the like, polyvinyl compounds such as esters (polyvinyl chloride) polyvinyl alcohol, anhydride condensation products, casein sheets, gelatin and the like.

The non-static material which I employ is, as stated, the intermolecular polycondensation product of a dibasic acid or anhydride and a hydroxy amine. The dibasic acid may be either an aromatic acid such as phthalic acid or anhydride, a saturated aliphatic acid, succinic or adipic acid or their anhydrides, or an unsaturated aliphatic acid such as maleic or fumaric acid or their anhydrides. The hydroxy amine may be either a monohydric or polyhydric substance; suitable monohydric amino alcohols are 2-amino, 2 methyl, 1 propanol and 2 amino, 1 butanol. Suitable polyhydroxy amines are 2 amino, 2 methyl, 1,3 propandiol and tris (hydroxy methyl) amino methane. It should be understood that the foregoing polybasic acids and hydroxy amines are specifically mentioned merely as illustrative of suitable compounds and that the broad class of polybasic organic acids and hydroxy amines are operative for the present invention.

The non-static resin may be prepared by mixing in suitable proportions a dibasic organic acid and a hydroxy amine and heating until esterification, amidation and imidation reactions take place. The proportions of the ingredients may be varied within fairly wide limits. Thus I have found that suitable non-static resins may be produced when the molar proportions are in the range of 1 to 3 mols of the hydroxy amine to 3 to 1 mols of the polybasic organic acid. These resins per se do not form a part of the present invention, their preparation is not therefore described in complete detail here. Suitable methods for their preparation are disclosed in the literature, thus, the preparation of several resins falling within the class which are employed in accordance with the present invention is disclosed in the Journal of American Chemistry Society, vol. 61, page 3381 (1939), and the methods therein described are applicable generally to producing resins of this class.

It should be noted that the resins obtained by reacting a monohydroxy amine with a dibasic acid or by reacting a polyhydroxy amine with phthalic acid are thermoplastic rather than thermosetting. These thermoplastic resins are frequently desirable since they do not require the rigid control in preparation which is necessary in the case of the thermosetting types of resins. They are also frequently preferable from the use standpoint since the thermoplastic resins are not affected adversely in numerous process steps to which the moulded article in which they are incorporated are subjected, such as drying steps and the like.

The accompanying drawing shows the invention applied to a photographic film. In Figure I the support I is made from an electrifiable high polymeric colloid, for instance, cellulose acetate with the addition of a minor amount of the intermolecular polymeric product of a dibasic acid and a hydroxy amine. It should be noted that the non-static resins of the type employed in accordance with the present invention are among the few resins which are compatible with cellulose acetate. The support I bears a conventional gelatin subbing layer 2 and a light sensitive layer 3 such as a gelatino-silver halide emulsion.

In another embodiment of the present invention illustrated in Figure II the support I is made from an electrifiable high polymeric colloid, for instance, cellulose acetate which may or may not be impregnated with a minor amount of a nonstatic resin of the type employed in the present invention. This support I is coated on both sides with a gelatin subbing layer 2 in which is incorporated a minor amount, generally about 12% of the solids content of a non-static resin, a conventional gelatino-silver halide emulsion light sensitive layer 3 is supported on the subbing layer 2. It should be noted that the resins employed in the present invention are among the few that are compatible with gelatin subbing layers commonly used in photographic films and thus the present invention is particularly valuable for the production of X-ray films in which, in accordance with conventional practice, both sides of the film are coated with a light sensitive layer and a gelatin subbing layer.

In the form a film illustrated in Fig. III the film base I which may be cellulose acetate is coated on one side with a gelatin subbing layer 2 to which in turn has been applied a conventional gelatino-silver halide emulsion light sensitive layer 3, on the other side of the film base has been applied an anti-static layer 4 of the intermolecular polycondensation product of a polybasic organic acid and a hydroxy amine.

Another possible form of film embodied in the present invention is illustrated in Fig. IV. As shown there the film base I is coated on one side with a conventional gelatin subbing layer 2, which in turn is coated with an anti-static layer 4 of the intermolecular polycondensation product of a polybasic organic acid and a hydroxy amine. A conventional gelatino-silver halide emulsion light sensitive layer 3 is applied to the anti-static layer 4.

The following examples illustrate the present invention:

*Example 1.*—The intermolecular polycondensation product obtained by reacting molar proportions of 2 amino, 2 methyl, 1,3 propandiol and phthalic anhydride was dissolved in a suitable solvent (an acetone-methanol mixture) so as to form a 0.2% solution of the resin. This solution was applied in known manner to one side of a film of cellulose acetate, and the film was subsequently coated on its other side with a conventional gelatin subbing layer and with a photographic emulsion. The film which is similar to that illustrated in Fig. IV was found to have excellent anti-static properties.

*Example 2.*—A gelatin subbing solution containing about .7 gm. of gelatin per 100 cc. was mixed with 0.1 gm. of the intermolecular polycondensation product of 2 amino, 2 methyl, 1,3-propandiol and phthalic anhydride. This gelatin subbing solution was employed for coating photographic films in the usual manner on both sides of the film and producing X-ray films as illustrated in Fig. II and on only one side of the film as illustrated in Fig. I. The films were subsequently coated with a photographic emulsion in the usual manner and all the films were found to have excellent anti-static properties. Similar films were produced using the intermolecular polycondensation product of 2 amino, 1 butanol and maleic anhydride and the films obtained were found to have excellent anti-static properties.

*Example 3.*—The intermolecular polycondensation product of 2 amino, 2 methyl, 1,3 propandiol and maleic anhydride was incorporated in a cellulose acetate film dope and the mixture cast in the same manner. The thus obtained film base was coated with conventional gelatin subbing solution and photographic emulsion in the known manner and the photographic film which was similar to the film illustrated in Fig. I thus obtained was found to have excellent anti-static properties.

It should be understood that the foregoing examples are illustrative only of the present invention and this invention is not limited to such examples. Other resins which I have employed and which impart excellent anti-static properties to photographic films are the intermolecular polycondensation product of tris (hydroxy methyl) amino methane and phthalic anhydride, also the intermolecular polycondensation product of 2 amino, 2 methyl, 1 propanol and adipic acid.

As indicated above, various modifications may be made in the present invention. Specifically, the anti-static resin may be incorporated in the finished photographic film in several manners. It may be admixed directly with the film base, it may be applied in admixture with a conventional gelatin subbing layer, or in admixture with a layer applied for some special purpose, for instance, an anti-halation layer or it may be applied as a separate layer or it may be applied in any combination of these manners. Generally, I prefer to incorporate the anti-static resin in either the film base dope, or in the conventional gelatin subbing layer, since by so doing the finished photographic film will be anti-static, but a separate processing step to impart such non-static properties thereto is unnecessary. Various other modifications will be apparent to those skilled in the art.

As heretofore stated the anti-static resins employed in accordance with the present invention are not claimed as novel per se and it should be understood that these resins may be modified in various ways by suitable treatment. Thus their molecular weight may be increased and consequently their melting point raised by distillation in a high vacuum or by distillation of a solution of the resins in a high boiling, water imiscible solvent (e. g. isophorone). The chemical groups may be modified, for instance, by acylation of any free —OH, —NH$_2$ or —NH groups or by esterification of free carboxyl groups. If the amino groups are removed the product becomes more soluble in alkali while if the hydroxyl groups are removed the amino group is more active. Likewise, mixtures of several polybasic acids and/or amino alcohols or diols may be employed. The degree of polymerization may be controlled by incorporating minor amounts of mono functional acids, alcohols or amines. Also by employing an unsaturated dibasic acid the double bond may be combined with various agents to impart special properties to the product. Thus the sulfonic acid groups may be introduced by treatment with sodium sulfite or bisulfite or an amino derivative may be obtained by treatment with liquid ammonia. By such treatment the water solubility and conductibility of the non-static resin may be increased or modified.

I claim:

1. An anti-static laminated photographic film which comprises a base of an electrifiable highly polymeric colloid, a layer of a photosensitive emulsion thereon, and a layer of the intermolecular polycondensation product of an organic polybasic acid and a hydroxy primary mono amine.

2. An anti-static laminated photographic film which comprises a base of an electrifiable highly polymeric colloid, a snubbing layer of gelatin emulsion containing as an anti-static agent a minor amount of the intermolecular polycondensation product of an organic polybasic acid and a hydroxy primary mono amine and a layer of a photosensitive emulsion thereon.

3. An anti-static laminated photographic film which comprises a base of a cellulose ester, a layer of a photosensitive emulsion thereon, and a layer of the intermolecular polycondensation product of an organic polybasic acid and a hydroxy primary mono amine.

4. An anti-static laminated photographic film which comprises a base of a cellulose acetate containing as an anti-static agent a minor amount of the intermolecular polycondensation product of an organic polybasic acid and a hydroxy primary mono amine and a layer of a photosensitive emulsion thereon.

5. An anti-static laminated photographic film which comprises a base of a cellulose ester containing as an anti-static agent a minor amount of the intermolecular polycondensation product of an organic polybasic acid and a hydroxy primary mono amine and a layer of a photosensitive emulsion thereon.

6. An anti-static laminated photographic film which comprises a base of an electrifiable highly polymeric colloid, a layer of a photosensitive emulsion thereon, and a layer of the intermolecular polycondensation product of phthalic acid and a primary mono amino diol.

7. An anti-static laminated photographic film which comprises a base of a cellulose ester containing as an anti-static agent a minor amount of the intermolecular polycondensation product of phthalic acid and a primary mono amino diol and a layer of a photosensitive emulsion thereon.

8. An anti-static photographic film which comprises a base of an electrifiable highly polymeric colloid, a photosensitive emulsion, and an anti-static agent comprising a minor amount of an intermolecular polycondensation product of an organic polybasic acid and a hydroxy mono-amine.

9. An anti-static photographic film which comprises a base of an electrifiable highly polymeric colloid, a photosensitive emulsion, and an anti-static agent comprising a minor amount of the intermolecular polycondensation product of an organic polybasic acid and a hydroxy primary mono-amine.

10. An anti-static laminated photographic film which comprises a base of an electrifiable highly polymeric colloid containing as an anti-static agent a minor amount of an intermolecular polycondensation product of an organic polybasic acid and a hydroxy primary mono-amine and a layer of a photosensitive emulsion thereon.

FRANK J. KASZUBA.